United States Patent
Yang et al.

(10) Patent No.: US 11,407,616 B2
(45) Date of Patent: Aug. 9, 2022

(54) ELEVATOR BELT SURFACE PROTECTION FOR INSTALLATION

(71) Applicant: OTIS ELEVATOR COMPANY, Farmington, CT (US)

(72) Inventors: Hong Yang, Avon, CT (US); Xiaoyuan Chang, Ellington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 208 days.

(21) Appl. No.: 16/752,026

(22) Filed: Jan. 24, 2020

(65) Prior Publication Data
US 2021/0229955 A1 Jul. 29, 2021

(51) Int. Cl.
| | | |
|---|---|---|
| *B66B 7/06* | (2006.01) | |
| *B32B 37/12* | (2006.01) | |
| *B66B 9/00* | (2006.01) | |
| *B66B 19/02* | (2006.01) | |
| *D07B 1/16* | (2006.01) | |
| *D07B 1/22* | (2006.01) | |

(52) U.S. Cl.
CPC .............. *B66B 7/062* (2013.01); *B32B 37/12* (2013.01); *B66B 9/00* (2013.01); *B66B 19/02* (2013.01); *D07B 1/162* (2013.01); *D07B 1/22* (2013.01); *D07B 2501/2007* (2013.01)

(58) Field of Classification Search
CPC ........... B66B 7/062; B66B 9/00; B66B 19/02; B32B 37/12; D07B 1/162; D07B 1/22; D07B 2501/2007
See application file for complete search history.

(56) References Cited

U.S. PATENT DOCUMENTS 8,449,349 B2 * 5/2013 Thompson .............. B66B 7/062
451/28
8,673,433 B2 * 3/2014 Reif ........................ B66B 7/062
428/212

(Continued)

FOREIGN PATENT DOCUMENTS

CN 101121487 A 2/2008
CN 103370194 A 10/2013

(Continued)

OTHER PUBLICATIONS

European Search Report for European Application No. 20216387.9; dated May 28, 2021; 44 pages.

(Continued)

*Primary Examiner* — Michael A Riegelman
(74) *Attorney, Agent, or Firm* — Cantor Colburn LLP

(57) ABSTRACT

A belt of an elevator system includes one or more tension elements extending longitudinally along a length of the belt, and an elastomeric jacket at least partially enveloping the one or more tension elements. The jacket defines a traction side configured to be interactive with a traction sheave of the elevator system and a back side opposite the traction side. A protective tape is applied to the elastomeric jacket at the back side. A method of assembling an elevator system includes forming a belt, and installing the belt in a hoistway of the elevator system. One or more additional components of the elevator system are installed in the hoistway. A protective tape is removed from a jacket of the belt after installation of the one or more additional components is completed.

17 Claims, 4 Drawing Sheets

(56) References Cited

U.S. PATENT DOCUMENTS

| | | | |
|---|---|---|---|
| 8,940,122 B2* | 1/2015 | Cohen | B29C 63/02 156/247 |
| 10,556,775 B2* | 2/2020 | Wesson | B66B 9/00 |
| 2002/0182415 A1 | 12/2002 | McLeod et al. | |
| 2005/0092425 A1 | 5/2005 | Abe et al. | |
| 2007/0034452 A1* | 2/2007 | Ach | B66B 7/062 187/254 |
| 2008/0116014 A1* | 5/2008 | Ach | F16G 5/20 187/252 |
| 2013/0171463 A1* | 7/2013 | Chang | B66B 7/06 428/549 |
| 2015/0191331 A1* | 7/2015 | Orelup | B29D 29/00 428/76 |
| 2015/0210510 A1* | 7/2015 | Chang | B66B 15/02 156/185 |
| 2016/0311649 A1* | 10/2016 | Puranen | B66B 1/3492 |
| 2017/0225925 A1* | 8/2017 | Wesson | D07B 5/006 |
| 2018/0282125 A1 | 10/2018 | Zhao | |
| 2019/0382242 A1 | 12/2019 | Mosher et al. | |
| 2020/0002123 A1* | 1/2020 | Rajagopalan | B66B 5/12 |
| 2021/0113928 A1 | 5/2021 | Mosher et al. | |
| 2021/0229955 A1* | 7/2021 | Yang | B32B 37/12 |

FOREIGN PATENT DOCUMENTS

| | | | |
|---|---|---|---|
| CN | 104671043 B | * 10/2019 | B66B 19/02 |
| DE | 102016209305 A1 | * 11/2017 | B66B 7/06 |
| TW | 200726713 A | 7/2007 | |

OTHER PUBLICATIONS

Chinese Office Action for Chinese Application No. 202011393539; dated May 9, 2022; 11 pages.

* cited by examiner

ELEVATOR BELT SURFACE PROTECTION FOR INSTALLATION

BACKGROUND

Exemplary embodiments pertain to the art of elevator systems. More particularly, the present disclosure relates to health monitoring of tension members of elevator systems, for example, of coated belts or ropes.

Elevator systems utilize one or more tension members operably connected to an elevator car and a counterweight in combination with, for example, a machine and traction sheave, to suspend and drive the elevator car along a hoistway. In some systems, the tension member is a belt having one or more tension elements retained in a jacket. The tension elements may be formed from, for example, steel wires or other materials, such as a carbon fiber composite. The tension elements support the load and the jacket holds the tension elements and transfers shear forces to the traction sheave.

Handling of the belt during installation of the belt can result in damage to the belt, and the belt may be further damaged during installation of other elevator system components in the hoistway. Such damage may include cracks in the jacket and more severe damage such as broken or damaged tension elements. The belt damage has significant impact on belt life and replacement cost.

BRIEF DESCRIPTION

In one embodiment, a belt of an elevator system includes one or more tension elements extending longitudinally along a length of the belt, and an elastomeric jacket at least partially enveloping the one or more tension elements. The jacket defines a traction side configured to be interactive with a traction sheave of the elevator system and a back side opposite the traction side. A protective tape is applied to the elastomeric jacket at the back side.

Additionally or alternatively, in this or other embodiments the protective tape is a clean peel tape.

Additionally or alternatively, in this or other embodiments the protective tape includes a protective layer configured to be one or more of abrasion resistant, scuff resistant or break resistant, and an adhesive layer located between the protective layer and the jacket to secure the protective tape to the jacket.

Additionally or alternatively, in this or other embodiments the protective layer includes a high strength polymer material with reinforcement.

Additionally or alternatively, in this or other embodiments the protective layer includes a polypropylene with glass yarn reinforcement.

Additionally or alternatively, in this or other embodiments the adhesive layer has multiple layers.

In another embodiment, an elevator system includes a hoistway and an elevator car movable along the hoistway. A belt is operably connected to the elevator car to move the elevator car along the hoistway. The belt includes one or more tension elements extending longitudinally along a length of the belt and an elastomeric jacket at least partially enveloping the one or more tension elements. The jacket defines a traction side configured to be interactive with a traction sheave of the elevator system and a back side opposite the traction side. A protective tape is applied to the elastomeric jacket at the back side.

Additionally or alternatively, in this or other embodiments the protective tape is a clean peel tape.

Additionally or alternatively, in this or other embodiments the protective tape includes a protective layer configured to be one or more of abrasion resistant, scuff resistant or break resistant, and an adhesive layer located between the protective layer and the jacket to secure the protective tape to the jacket.

Additionally or alternatively, in this or other embodiments the protective layer includes a high strength polymer material with reinforcement.

Additionally or alternatively, in this or other embodiments the protective layer includes a polypropylene with glass yarn reinforcement.

Additionally or alternatively, in this or other embodiments the adhesive layer has multiple layers.

In yet another embodiment, a method of assembling an elevator system includes forming a belt including one or more tension elements extending longitudinally along a length of the belt, and an elastomeric jacket at least partially enveloping the one or more tension elements. The jacket defines a traction side configured to be interactive with a traction sheave of the elevator system and a back side opposite the traction side. A protective tape is applied to the elastomeric jacket at the back side. The belt is installed in a hoistway of the elevator system. One or more additional components of the elevator system are installed in the hoistway. The protective tape is removed from the jacket after installation of the one or more additional components is completed.

Additionally or alternatively, in this or other embodiments the protective tape is applied to the jacket via one of a roll or a precut length of protective tape.

Additionally or alternatively, in this or other embodiments the protective tape is a clean peel tape.

Additionally or alternatively, in this or other embodiments the protective tape includes a protective layer configured to be one or more of abrasion resistant, scuff resistant or break resistant, and an adhesive layer located between the protective layer and the jacket to secure the protective tape to the jacket.

Additionally or alternatively, in this or other embodiments the protective layer includes a high strength polymer material with reinforcement.

Additionally or alternatively, in this or other embodiments the protective layer includes a polypropylene with glass yarn reinforcement.

Additionally or alternatively, in this or other embodiments the adhesive layer has multiple layers.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
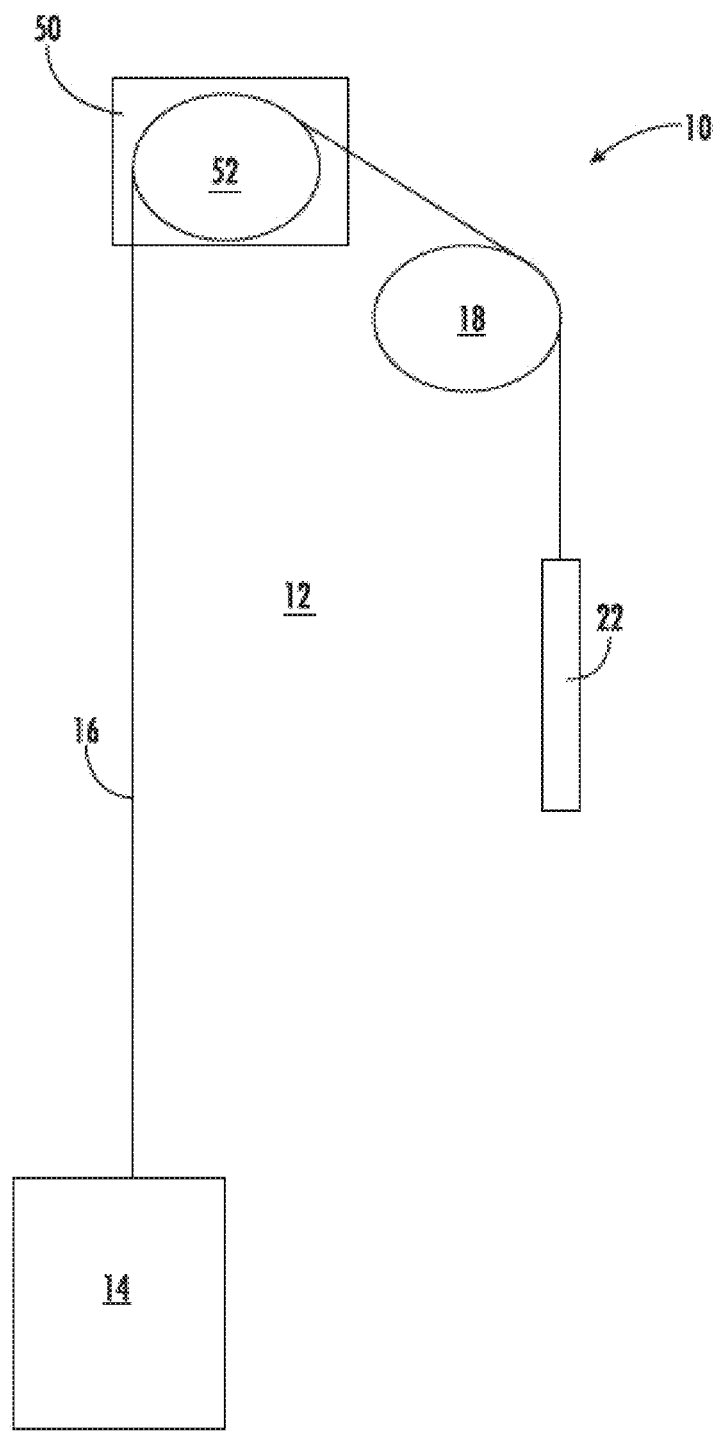
FIG. 1 is a schematic illustration of an elevator system.

Shown in FIG. 1 is a schematic view of an exemplary traction elevator system 10. Features of the elevator system 10 that are not required for an understanding of the present invention (such as the guide rails, safeties, etc.) are not discussed herein. The elevator system 10 includes an elevator car 14 operatively suspended and/or propelled in a hoistway 12 with one or more tension members, for example belts 16. While in the following description, belts 16 are the tension members utilized in the elevator system, one skilled in the art will readily appreciate that the present disclosure may be utilized with other tension members, such as ropes or braided tapes. The one or more belts 16 interact with sheaves 18 and 52 to be routed around various components of the elevator system 10. Sheave 18 is configured as a diverter, deflector or idler sheave and sheave 52 is configured as a traction sheave, driven by a machine 50. Movement of the traction sheave 52 by the machine 50 drives, moves and/or propels (through traction) the one or more belts 16 that are routed around the traction sheave 52. Diverter, deflector or idler sheaves 18 are not driven by a machine 50, but help guide the one or more belts 16 around the various components of the elevator system 10. The one or more belts 16 could also be connected to a counterweight 22, which is used to help balance the elevator system 10 and reduce the difference in belt tension on both sides of the traction sheave during operation. The sheaves 18 and 52 each have a diameter, which may be the same or different from each other.

In some embodiments, the elevator system 10 could use two or more belts 16 for suspending and/or driving the elevator car 14. In addition, the elevator system 10 could have various configurations such that either both sides of the one or more belts 16 engage the sheaves 18, 52 or only one side of the one or more belts 16 engages the sheaves 18, 52. The embodiment of FIG. 1 shows a 1:1 roping arrangement in which the one or more belts 16 terminate at the elevator car 14 and counterweight 22, while other embodiments may utilize other roping arrangements.

The belts 16 are constructed to meet belt life requirements and have smooth operation, while being sufficiently strong to be capable of meeting strength requirements for suspending and/or driving the elevator car 14 and counterweight 22.

Figure 2:
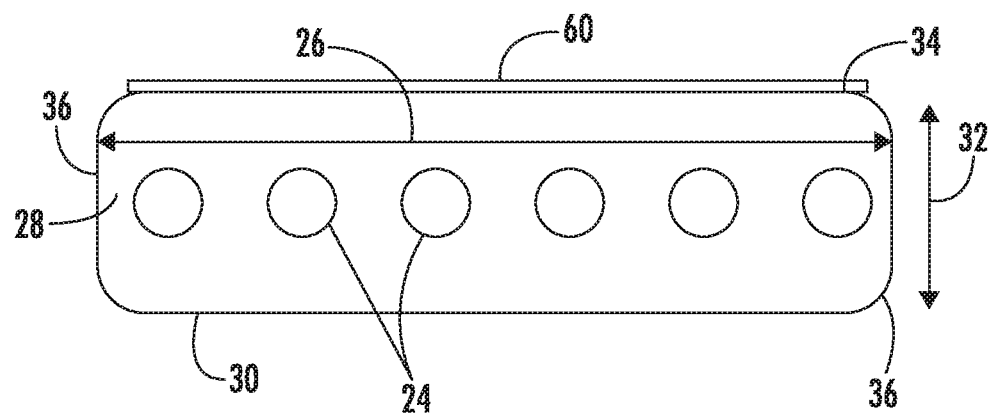
FIG. 2 is a cross-sectional view of an embodiment of an elevator system belt.

FIG. 2 provides a cross-sectional schematic of an exemplary belt 16 construction or design. The belt 16 includes a plurality of tension elements 24 extending longitudinally along the belt 16 and arranged across a belt width 26. The tension elements 24 are at least partially enclosed in a jacket 28 to restrain movement of the tension elements 24 in the belt 16 with respect to each other and to protect the tension elements 24. The jacket 28 defines a traction side 30 configured to interact with a corresponding surface of the traction sheave 52. A primary function of the jacket 28 is to provide a sufficient coefficient of friction between the belt 16 and the traction sheave 52 to produce a desired amount of traction there between. The jacket 28 should also transmit the traction loads to the tension elements 24. In addition, the jacket 28 should be wear resistant, fatigue resistant and protect the tension elements 24 from impact damage, exposure to environmental factors, such as chemicals, for example.

Exemplary materials for the jacket 28 include the elastomers of thermoplastic and thermosetting polyurethanes, thermoplastic polyester elastomers, ethylene propylene diene elastomer, chloroprene, chlorosulfonyl polyethylene, ethylene vinyl acetate, polyamide, polypropylene, butyl rubber, acrylonitrile butadiene rubber, styrene butadiene rubber, acrylic elastomer, fluoroelastomer, silicone elastomer, polyolefin elastomer, styrene block and diene elastomer, natural rubber, or combinations thereof. Other materials may be used to form the jacket material 28 if they are adequate to meet the required functions of the belt 16.

The belt 16 has a belt width 26 and a belt thickness 32, with an aspect ratio of belt width 26 to belt thickness 32 greater than one. The belt 16 further includes a back side 34 opposite the traction side 30 and belt edges 36 extending between the traction side 30 and the back side 34. While six tension elements 24 are illustrated in the embodiment of FIG. 2, other embodiments may include other numbers of tension elements 24, for example, 4, 10 or 12 tension elements 24. Further, while the tension elements 24 of the embodiment of FIG. 2 are substantially identical, in other embodiments, the tension elements 24 may differ from one another. While a belt 16 with a rectangular cross-section is illustrated in FIG. 2, it is to be appreciated that belts 16 having other cross-sectional shapes are contemplated within the scope of the present disclosure.

Figure 3A:
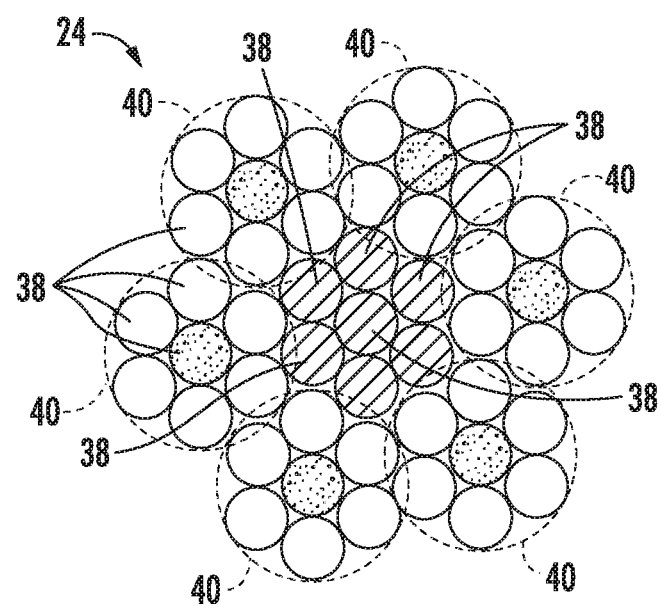
FIG. 3A is a cross-sectional view of an embodiment of a tension element for an elevator belt.
Figure 3B:
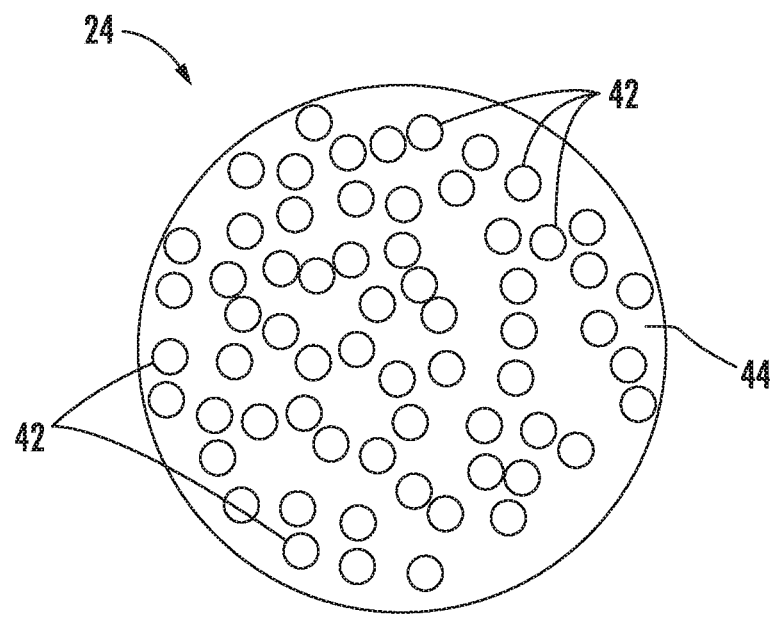
FIG. 3B is a cross-sectional view of another embodiment of a tension element for an elevator belt.

Referring now to FIG. 3A, the tension element 24 may be a plurality of wires 38, for example, steel wires 38, which in some embodiments are formed into one or more strands 40. In other embodiments, such as shown in FIG. 3B, the tension element 24 may include a plurality of fibers 42, such as carbon fiber, glass fiber aramid fiber, or their combination, disposed in a matrix material 44. Materials such as polyurethane, vinylester, or epoxy may be utilized as the matrix material, as well as other thermoset materials and, for example, thermoset polyurethane materials. While a circular cross-sectional tension element geometry is illustrated in the embodiment of FIG. 3B, other embodiments may include different tension element cross-sectional geometries, such as rectangular or ellipsoidal. While the cross-sectional geometries of the tension elements 24 in FIG. 2 are shown as identical, in other embodiment the tension elements' cross-sectional geometries may differ from one another. Further, while the present disclosure is described in the context of a belt 16, one skilled in the art will readily appreciate that the disclosure may be readily applied to elevator systems 10 utilizing other types of tension members, for example a coated rope. Further, the present disclosure may be utilized with not only a tension member, but also a compensation member.

Referring again to FIG. 2, it is desired to prevent damage to the belt 16 during handling and installation of the belt 16, and installation of other elevator system 10 components in the hoistway 12. To achieve this, a protective tape 60 is applied to the belt 16 over the jacket material 28 at the back side 34 of the belt 16, opposite the traction side 30. In some embodiments, the tape 60 is a clean peel tape which may be easily removed when desired, such as when installation of the elevator system 10 is completed. When utilizing a clean peel structure, the protective tape 60 is removable leaving minimal or no adhesive residue on the back side 34, which if remained would reduce elevator system 10 performance.

Figure 4:
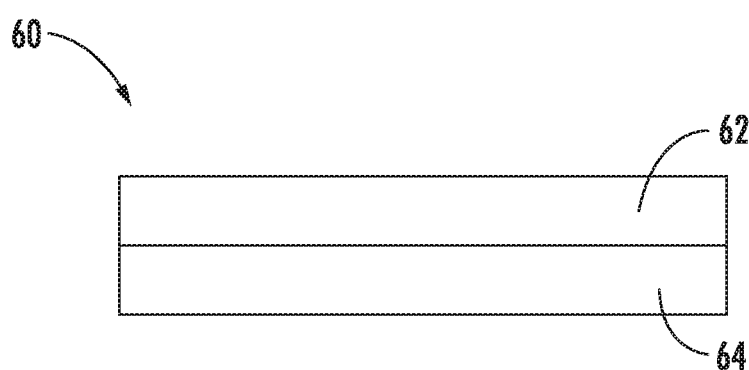
FIG. 4 is a cross-sectional view of an embodiment of a protective tape of an elevator belt.

Referring now to FIG. 4, a cross-sectional view of an exemplary protective tape 60 is illustrated. The protective tape 60 includes a protective layer 62 and an adhesive layer 64, with the adhesive layer 64 configured to be affixed to the back side 34 of the belt. In some embodiments, the protective layer 62 includes a high strength polymer material with reinforcement, such as a polypropylene with glass yarn reinforcement. The protective layer 62 enhances abrasion resistance, scuff resistance and break resistance of the protective tape 60. The adhesive layer 64 includes, for example, a multi-layer synthetic rubber adhesive to prevent delamination of the protective tape 60 from the back side 34 of the belt 16. The adhesive is removed from the back side 34 when selected, without leaving adhesive residue on the back side 34.

In one embodiment, the protective tape 60 is commercially-available 3M™ Polyurethane Protective Tape 8547. The exemplary protective tape 60 is a removable, flame resistant tape made from an abrasion resistant polyurethane elastomer that resists puncture, tearing, abrasion and erosion. It has been utilized as a temporary, flame retardant shield to prevent weld splatter from damaging glass, ducting and other components during welding operations.

Figure 5:
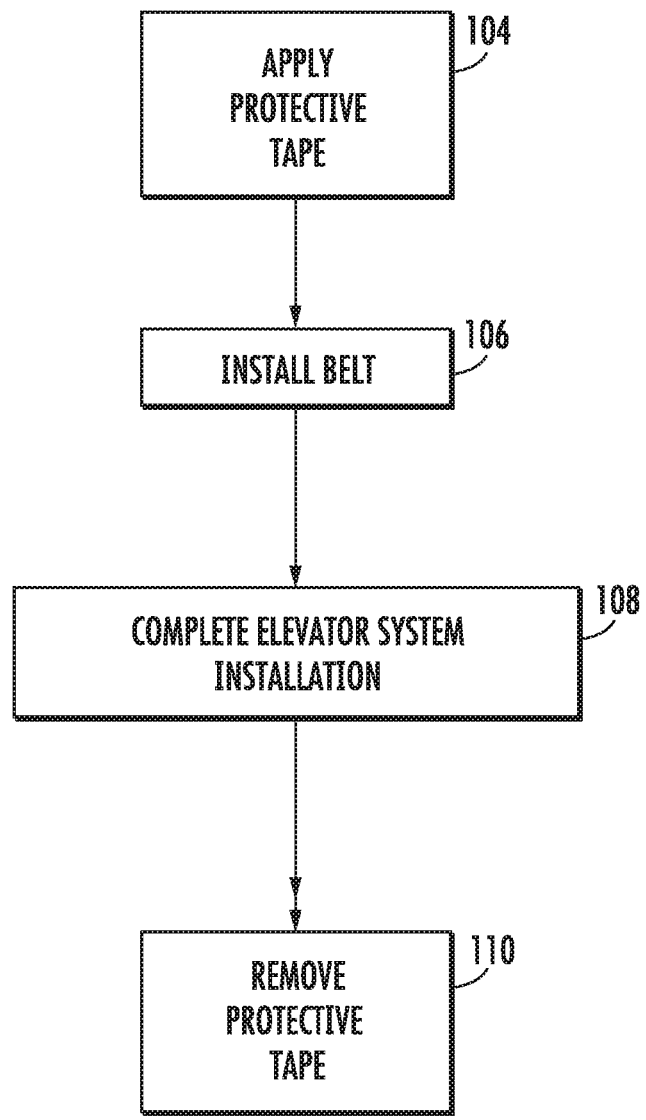
FIG. 5 is a schematic illustration of a method of installation of an elevator system.

Referring now to FIG. 5, illustrated is a method of elevator system 10 installation 100 utilizing the protective tape 60. The protective tape 60 is applied to the back side 34 of the belt 16 at block 104. In some embodiments, the protective tape 60 is applied at a manufacturer site, and may be applied from, for example, a roll of protective tape 60 at a takeoff section of a manufacturing line, or by applied a cut-to-length protective tape 60 to the back side 34 post-manufacture of the belt 16. This may be performed at the factory or on site at installation time.

In block 106, the belt 16 is installed to the hoistway 12 with the traction side 30, opposite the back side 34, interactive with the traction sheave 52. In block 108, installation of other components of the elevator system 10 is completed, with the protective tape 60 providing damage protection to the belt 16 during installation of the components of the elevator system 10. At block 110, once installation of the elevator system 10 components is completed, the protective tape 60 is removed from the belt 16, so that the belt 16 is ready for service in the elevator system 10.

Use of the protective tape 60 applied to the back side 34 of the belt 16 provides protection to the jacket 28 and the tension elements 24 of the belt 16 thereby preventing loss of service life of the belt 16 due to installation damage. This results in greater elevator system 10 performance and reduced installation and operational costs of the elevator system 10 because of a reduced rate of replacement of the belt 16 due to such installation damage.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A belt of an elevator system, comprising:
   one or more tension elements extending longitudinally along a length of the belt;
   an elastomeric jacket at least partially enveloping the one or more tension elements, the jacket defining a traction side configured to be interactive with a traction sheave of the elevator system and a back side opposite the traction side; and
   a protective tape applied to the elastomeric jacket at the back side; wherein the protective tape includes:
   a protective layer configured to be one or more of abrasion resistant, scuff resistant or break resistant; and
   an adhesive layer disposed between the protective layer and the jacket to secure the protective tape to the jacket.

2. The belt of claim 1, wherein the protective tape is a clean peel tape, which is removable leaving no adhesive residue on the elastomeric jacket.

3. The belt of claim 1, wherein the protective layer includes a high strength polymer material with reinforcement.

4. The belt of claim 3, wherein the protective layer includes a polypropylene with glass yarn reinforcement.

5. The belt of claim 1, wherein the adhesive layer has multiple layers.

6. An elevator system, comprising:
   a hoistway;
   an elevator car movable along the hoistway;
   a belt operably connected to the elevator car to move the elevator car along the hoistway, the belt including:
   one or more tension elements extending longitudinally along a length of the belt;
   an elastomeric jacket at least partially enveloping the one or more tension elements, the jacket defining a traction side configured to be interactive with a traction sheave of the elevator system and a back side opposite the traction side; and
   a protective tape applied to the elastomeric jacket at the back side; wherein the protective tape includes:
   a protective layer configured to be one or more of abrasion resistant, scuff resistant or break resistant; and
   an adhesive layer disposed between the protective layer and the jacket to secure the protective tape to the jacket.

7. The elevator system of claim 6, wherein the protective tape is a clean peel tape, which is removable leaving no adhesive residue on the elastomeric jacket.

8. The elevator system of claim 6, wherein the protective layer includes a high strength polymer material with reinforcement.

9. The elevator system of claim 8, wherein the protective layer includes a polypropylene with glass yarn reinforcement.

10. The elevator system of claim 6, wherein the adhesive layer has multiple layers.

11. A method of assembling an elevator system, comprising:
applying a protective tape to an elastomeric jacket at a back side of a belt, the belt including:
one or more tension elements extending longitudinally along a length of the belt; and
an elastomeric jacket at least partially enveloping the one or more tension elements, the jacket defining a traction side configured to be interactive with a traction sheave of the elevator system and a back side opposite the traction side;
wherein the protective tape includes:
a protective layer configured to be one or more of abrasion resistant, scuff resistant or break resistant; and
an adhesive layer disposed between the protective layer and the jacket to secure the protective tape to the jacket.

12. The method of claim 11, wherein the protective tape is applied to the jacket via one of a roll or a precut length of protective tape.

13. The method of claim 11, wherein the protective tape is a clean peel tape, which is removable leaving no adhesive residue on the elastomeric jacket.

14. The method of claim 11, wherein the protective layer includes a high strength polymer material with reinforcement.

15. The method of claim 11, wherein the protective layer includes a polypropylene with glass yarn reinforcement.

16. The method of claim 11, wherein the adhesive layer has multiple layers.

17. The method of claim 11, further comprising:
installing the belt in a hoistway of the elevator system;
installing one or more additional components of the elevator system in the hoistway; and
removing the protective tape from the jacket after installation of the one or more additional components is completed.

* * * * *